United States Patent Office 3,738,867
Patented June 12, 1973

3,738,867
REMOVAL OF METAL CONTAINING DEPOSITS
FROM NON-METALLIC SUBSTRATES
Helmut Franz, Oakmont, Pa., assignor to PPG
Industries, Inc., Pittsburgh, Pa.
Filed Apr. 1, 1971, Ser. No. 130,468
Int. Cl. B08b 3/08; C03c 23/00
U.S. Cl. 134—2
4 Claims

ABSTRACT OF THE DISCLOSURE

The removal of metal containing deposits from non-metallic substrates, such as glass, using solutions containing 0.05 to 10 percent oxidizing agent, such as hydrogen peroxide, sodium perborate, sodium persulfate, potassium persulfate/ammonium persulfate or the like. The resulting metal containing spent solution is easily treated to yield an essentially non-polluting effluent.

BACKGROUND OF THE INVENTION

This invention relates to the art of coating non-metallic substrates with metal containing deposits and more particularly to methods for preparing such substrates for coating by the removal of undesired deposits.

Non-metallic substrates are coated with relatively thin metal containing coatings by a variety of techniques to provide a wide range of products. For instance transparent substrates, such as glass and organic polymeric materials like methylmethacrylate, polycarbonate, etc., may be coated with one or more layers of metal containing coatings to provide particular transmission and reflectance characteristics for energy throughout the spectrum and to provide, in some instances, for electrical conductivity. Metal containing deposits are produced on non-metallic substrates by several commonly used techniques including vapor deposition, vacuum sputtering, electroless plating, electrolytic plating, pyrolysis of organo-metallic compounds and the like.

In the preparation of coated non-metallic substrates, it is necessary to initially clean the surface to be coated if imperfections in the final coating are to be avoided. Despite such pretreatment cleaning, imperfections in final coatings at times still occur due to imperfect control of processing variables in the deposition treatment itself. When the coated articles are of inferior quality, it is desirable in the interest of economy to reprocess the substrates. Prior to reprocessing such substrates, it is necessary to remove the imperfect deposit from the substrate as part of the overall operation.

It has been common practice in the art to remove the metal containing deposits from such substrates by contacting the deposits with dichromate cleaning solutions similar to those commonly used for cleaning laboratory glassware. Thus, for example, solutions containing about 10 percent sulfuric acid and 2.5 to 3 percent dichromate have been used in the past to remove metallic deposits from glass.

The common metal deposit stripping solutions used are concentrated nitric acid and mixtures of sulfuric acid and sodium dichromate. Such solutions are highly acidic with measured pH values of about zero or less.

Spent dichromate solutions from such stripping operations generally contain the dissolved metals and excess dichromate which interferes with removal of metals from dichromate solution. Also, in using relatively concentrated nitric acid to remove nickel, copper and silver films, the nitric acid concentrations suitable for this purpose tend to be corrosive. They also cause atmospheric as well as water pollution problems.

Use of these conventional stripping solutions on a commercial scale therefore poses severe corrosion and effluent pollution problems entailing considerable cost. Thus, special materials of construction and special effluent treatment are necessary when using these stripping methods.

Accordingly, it is an object of this invention to provide stripping methods which are convenient and effective and also safe and non-polluting.

SUMMARY OF THE INVENTION

Metal containing deposits are removed with ease from non-metallic substrates in accordance with this invention by contacting the deposits with stripping solutions containing as an essential ingredient a effective amount, typically from about 0.05 to about 10 percent by weight, of an oxidizing agent such as hydrogen peroxide or alkali metal, alkaline earth metal and ammonium peroxides, perborates and persulfates, such as sodium perborate, sodium peroxide, sodium persulfate, potassium peroxide, potassium persulfate, lithium peroxide, ammonium persulfate, magnesium perborate, magnesium peroxide, calcium perborate, calcium peroxide and their mixtures.

The solutions useful in this invention are generally aqueous, but organic solvents may also be used.

Useful stripping solutions may be acidic, basic or neutral.

The solution pH may be 2–9, preferably 5–6, in which case the concentration of oxidizing agent should be 0.1 to 10 percent by weight and preferably 0.1 to 2.5 percent by weight. Within this pH range, the preferred oxidizing agents are persulfates. Using such substantially neutral stripping solutions, a metal deposit of about one gm./m.$^2$ of copper or silver is removed in less than one minute. A metal deposit of about 150 mg./m.$^2$ of nickel, iron, cobalt, tin, chrome or the like is removed in about five to ten seconds at a temperature of about 20 to 25° C.

Basic persulfate solutions of about 9–12 pH and preferably 11–12 pH are useful to remove silver and copper at a rate somewhat less than for the neutral solutions; removal of other metals is less effective. Ammonia or any alkali metal hydroxide or carbonate or any alkaline earth metal hydroxide may be employed to control solution pH. Use of about 1 to 2 percent by weight ammonia to adjust the pH of the solutions to about 11–12 pH results in greatly improved stripping. Ammonia apparently complexes the metal ions permitting rapid removal of metal containing deposits using any of the oxidizing agents mentioned above. Ammonia is effective in any of the stripping solutions of this invention but is more effective in perborate and persulfate solutions than peroxide solutions due to oxidation of ammonia by peroxides limiting solution life. A preferred method uses acidic solutions of pH 0.5 to 2, with 0.05 to 2.5, preferably 0.1 to 1.5, percent by weight oxidizing agent being employed. Using such acidic solutions, a metal deposit of about 0.1–1.0 gm./m.$^2$ of any of the above mentioned metals is completely removed in about five to ten seconds at a temperature of about 20 to 25° C. Solutions are preferably acidified to about 0.01 to 0.1 normal using a mineral acid, such as hydrochloric acid, nitric acid, phosphoric acid or sulfuric acid, preferably sulfuric acid. Strong organic acids may also be employed.

The examples following describe in detail the utility and character of this invention.

EXAMPLE I

An aqueous solution consisting of 1 percent hydrochloric acid and 0.5 percent by weight hydrogen peroxide at room temperature was poured on a 5 foot x 8 foot glass plate having a coating of silver and copper which had been applied according to the teaching of R. G. Miller in U.S. Pat. No. 3,457,138. After five seconds contact, the solution was rinsed away with water. No metal coating remained.

EXAMPLE II

A tank was filled with 50 gallons of water to which was added 3 gallons of hydrochloric acid, technical grade 35% and ¾ gallon hydrogen peroxide, technical grade 30–35%. The pH of the resulting solution was determined to be 0.6 and the hydrogen peroxide content was determined to be 0.7% by weight by conventional titration of liberated iodine with thiosulfate. Thirty glass plates, 40 inches x 70 inches, were contacted with the solution for about one minute each at room temperature (25° C.) and then rinsed with water. Prior to contact with the solution, each plate had been coated with a nickel film on one side according to the method of copending application, Ser. No. 57,451, filed July 23, 1970, entitled, "Wet Chemical Method of Producing Transparent Metal Films," by R. G. Miller and assigned to the present assignee. The nickel-containing deposit was about 130 mg./m.$^2$ with a visible transmittance of about 22 percent. All plates appeared perfectly clear after treatment having the transmittance of the glass. During processing, rinse water continuously diluted the stripping solution. After stripping the 30 plates, the diluted 90 gallons of stripping solution remained. This solution had a pH of 1.0 and a hydrogen peroxide concentration of 0.4 percent, yet the last plate treated was completely stripped of metallic deposit.

EXAMPLE III

A 5 percent by weight aqueous solution of potassium persulfate was prepared. The solution had a pH of 5.8. Several samples of glass were prepared with a nickel-containing coating deposited by reduction of nickel acetate with a sodium borohydride mixture according to the method of R. G. Miller referred to in Example II. The nickel coating was about 130 mg./m.$^2$, and the coated plates each had a visible transmittance of about 22 percent. Several samples of glass were prepared with a copper-silver coating applied according to the method of U.S. Pat. No. 3,457,138. The copper-silver coating was about one gm./m.$^2$, and the coated plates had a visible transmittance of about 20 percent. The relative amounts of copper and silver in these coatings were about 35 percent by weight copper and about 65 percent by weight silver.

The plates coated as described were dipped in the stripping solution, and the time for complete removal of the coating films noted as observed by visible transmittance matching that of clear uncoated glass of identical composition. Sulfuric acid was added in increments to the stripping solution to adjust the pH downward. Additional plates were stripped at various pH levels and the time for complete stripping noted. The results of these observations appear in Table I.

TABLE I.—POTASSIUM PERSULFATE STRIPPING OF METAL FILMS

| Stripping solution pH: | Time to strip nickel, seconds | Time to strip copper-silver, seconds |
|---|---|---|
| 5.8 | 20 | 65 |
| 4.2 | 20 | 75 |
| 3.2 | 14 | 90 |
| 2.4 | 13 | 105 |
| 1.5 | 11 | 105 |

Coatings containing silver appear difficult to remove. In the absence of a complexing agent to capture dissolved silver, apparent passivation occurs which retards further removal. Any known complexer may be advantageously employed with the copper-silver film removal here described.

EXAMPLE IV

Nickel and copper-silver coated plates, as described above, were stripped using dichromate stripping solution of the prior art for comparison. An aqueous dichromate solution, 5 percent by weight sodium dichromate, was prepared. The pH was adjusted with sulfuric acid. As before, plates were dipped in solutions of differing pH and the time for complete coating removal noted. The results are summarized in Table II.

TABLE II.—DICHROMATE STRIPPING OF METAL FILMS

| Stripping solution pH: | Time to strip nickel, seconds | Time to strip copper-silver, seconds |
|---|---|---|
| 4.1 | >120 | >120 |
| 2.5 | >120 | >120 |
| 0.8 | 1 | 8 |

EXAMPLE V

Nickel and copper-silver coated plates as described above, were stripped using hydrogen peroxide solutions. An aqueous solution of hydrogen peroxide, 5 percent by weight, was prepared. The pH was adjusted with sulfuric acid. As in Example III, plates were dipped in solutions of differing pH and the time for complete coating removal noted. The results are summarized in Table III.

TABLE III.—HYDROGEN PEROXIDE STRIPPING OF METAL FILMS

| Stripping solution pH: | Time to strip nickel, seconds | Time to strip copper-silver, seconds |
|---|---|---|
| 5.0 | >120 | >120 |
| 2.4 | 70 | 15 |
| 0.7 | 1 | >120 |
| Ammonia was then added to raise the pH | | |
| 9.4 | >120 | >120 |
| 11.5 | >120 | 3 |

EXAMPLE VI

Nickel and copper-silver coated plates, as described above in Example III, were stripped using sodium perborate solutions. An aqueous solution of sodium perborate, 5 percent by weight, was prepared. The pH was adjusted with sulfuric acid. As before, plates were dipped in solutions of differing pH and the time for complete coating removal noted. The results are summarized in Table IV.

TABLE IV.—SODIUM PERBORATE STRIPPING OF METAL FILMS

| Stripping solution pH: | Time to strip nickel, seconds | Time to strip copper-silver, seconds |
|---|---|---|
| 10.4 | 120 | 120 |
| 5.3 | 120 | 120 |
| 2.9 | 90 | 120 |
| 1.3 | 1.5 | 20 |
| Ammonia was then added to raise the pH | | |
| 11.1 | >120 | >120 |
| 11.5 | >120 | 10 |

EXAMPLE VII

Examples III, V and VI were repeated using 2 percent by weight oxidizing agents. The coatings were removed, but coating removal times were proportionately slower.

EXAMPLE VIII

An aqueous solution of potassium peroxide, 2 percent by weight, is adjusted to about pH 11.5 with ammonia and a plate coated with a copper-silver film, prepared as described in Example III, is dipped in the solution. Immediately upon contact, less than one second, the coating is completely removed.

EXAMPLE IX

Glass plates coated with nickel-containing films as described in Example III were contacted with stripping solutions of differing hydrogen peroxide and acid concentration to determine whether a combination of acid and hydrogen peroxide provides improved stripping over either alone. The nickel coating amounted to about 150 mg./m.$^2$ on the sample plates. Table V summarizes the observations.

TABLE V.—HYDROGEN PEROXIDE-HYDROCHLORIC ACID STRIPPING

| $H_2O_2$, wt. percent | pH | HCl conc. (cc./100 cc.) | Time to strip nickel |
|---|---|---|---|
| 5.0 | 1.0 | 1 | Very rapid: <1 second. |
| 1.0 | 1.0 | 1 | Do. |
| 0.2 | 1.0 | 1 | Slower: 10 seconds. |
| 0.2 | 0.5 | 2 | Fast: 1-5 seconds. |
| 0.1 | 0.5 | 2 | Do. |
| 0.05 | 0.5 | 2 | Slower: 10 seconds. |
| 0.05 | 0.2 | 3 | Fast: 1-5 seconds. |
| 5.0 | 5.3 | 0 | No coating removal. |
| 0 | 0.2 | 3 | Do. |

EXAMPLE X

Nickel and copper-silver coated glass plates, as described in Example III above, were stripped with ammonium persulfate solutions to which ammonia was added to control the pH of the solutions. The pronounced effect of ammonia upon the copper-silver coating may be compared with the effects observed in Table I of Example III. The copper-silver content of the coatings in this example was about 65 percent by weight copper and about 35 percent by weight silver, and the coatings were about 1 gm./m.$^2$. The nickel coatings were about 150 mg./m.$^2$. Table VI summarizes the observations of this test.

TABLE VI.—EFFECT OF AMMONIA ON METAL REMOVAL RATES

| Ammonium persulfate, wt. percent | Solution volume, ml. | Ammonia addition, ml. | pH | Time to strip nickel, seconds | Time to strip copper-silver, seconds |
|---|---|---|---|---|---|
| 50 | 20 | 0 | 1.6 | 6 | 6 |
| | | 0.3 | 9.0 | 20 | 1 |
| | | 0.8 | 9.1 | 15 | <1 |
| | | 1.0 | 9.2 | 12 | <1 |
| | | 2 | 9.3 | 15 | <1 |
| | | 3 | 9.3 | 15 | <1 |
| | | 7 | 9.7 | 14 | <1 |
| | | 10 | 10.0 | 12 | <1 |
| | | 15 | 10.3 | 10 | <1 |
| | | 20 | 10.4 | 8 | <1 |
| 20 | 35 | 0 | 2.0 | 15 | 20 |
| | | 1 | 9.2 | 15 | 2 |
| | | 3 | 9.7 | 14 | <1 |
| | | 5 | 9.9 | 14 | <1 |
| | | 10 | 10.1 | 12 | <1 |
| | | 20 | 10.4 | 10 | <1 |
| 5 | 50 | 0 | 2.8 | 15 | 35 |
| | | 1 | 9.6 | 30 | 5 |
| | | 3 | 10.0 | | 4 |
| | | 5 | 10.2 | | 4 |
| | | 10 | 10.4 | | 3 |
| 2 | 50 | 0 | 2.9 | | (¹) |
| | | 3 | 10.0 | | 3 |
| | | 10 | 10.4 | | 6 |
| 1 | 50 | 0 | 3.3 | 20 | (¹) |
| | | 3 | 10.1 | | 10 |
| | | 10 | 10.7 | | 10 |
| 0.5 | 50 | 3 | 10.4 | | 90 |
| 0.1 | 30 | 3 | 10.9 | | (²) |

¹ Removal incomplete.
² Incomplete.

EXAMPLE XI

A stripping solution was prepared by mixing 35 gallons of water, one half gallon of sulfuric acid (66° Baumé) and one half gallon of hydrogen peroxide (technical grade, 35%). The solution at about 23° C. was sprayed onto 70 inch x 40 inch glass plates coated with nickel as described above (150 mg./m.$^2$), and the plates rinsed with water. Contact time between the solution and each plate was about 30 seconds. After 280 plates had been contacted, the plates were examined. All plates were completely clear of coating.

Glass plates, which have been stripped according to any of the above-described methods, may be resensitized with palladium chloride and stannous chloride or other agents and may be recoated by any known coating method.

It has been found that for removal of nickel containing films a preferred pH range is from about 0.5 to about 2.0, more preferably about 1.0, and that any oxidizing agent is effective at a pH within the preferred range. At higher pH, above neutral, it has been found that the persulfates are most effective of the oxidizing agents.

For removal of copper or silver, it is most advantageous to include ammonia in the stripping solution, irregardless of pH. The presence of ammonia has been found particularly effective at a pH between about 9 and 12, preferably between about 11 and 12.

It has been found particularly effective to contact metal coated substrates with the stripping solutions of this invention for a time sufficient to remove the metal coating but insufficient to penetrate or effectively attack the substrate. It has further been found particularly effective to remove metal containing deposits by contact with stripping solutions well below the boiling point of the solvent or vehicle employed. Stripping carried out as here described using short contact times, on the order of two minutes or less, and moderate temperatures, preferably about room temperature, insures a cleaned substrate, particularly glass, undamaged by the cleaning process and avoids fuming, volatilization and loss of active stripping agents from the stripping solution during processing.

Although the present invention has been described with respect to specific details of certain embodiments thereof, it is not intended that such details act as limitations upon the scope of the invention; but rather, the invention is limited only as here claimed.

What is claimed is:
1. A method of stripping a copper or silver deposit from a non-metallic substrate comprising contacting the deposit with an aqueous stripping solution having a pH between about 9 and about 12 comprising
   (a) water,
   (b) .05 to 10 percent by weight of an alkali metal persulfate, an alkaline earth metal persulfate or ammonium persulfate, and
   (c) 1 to 10 percent by weight ammonia.
2. The method of claim 1 wherein the persulfate is ammonium persulfate and the solution pH is between about 11 and 12.
3. A method of stripping a metal containing deposit from a non-metallic substrate comprising contacting the deposit with an aqueous stripping solution having a pH between about 0.5 and 2 comprising
(a) water,
(b) 0.05 to 2.5 percent by weight of an oxidizing agent selected from the group consisting of hydrogen peroxide, sodium perborate, sodium persulfate, potassium peroxide, potassium perborate, potassium persulfate, ammonium persulfate and mixtures thereof, and
(c) an effective amount of mineral acid to establish the pH.

4. The method of claim 3 wherein the oxidizing agent is hydrogen peroxide in an amount of from 0.1 to 1.5 percent by weight, and the mineral acid is sulfuric acid.

References Cited

UNITED STATES PATENTS

| | | | |
|---|---|---|---|
| 2,978,366 | 4/1961 | Harwig et al. | 134—3 |
| 2,981,642 | 4/1961 | Danaczko | 134—2 |
| 3,173,874 | 3/1965 | Sewell et al. | 134—2 X |
| 3,351,556 | 11/1967 | Tsourmas | 252—102 |
| 3,382,182 | 5/1968 | Moyer | 134—2 X |
| 3,383,319 | 5/1968 | Black | 134—2 X |
| 3,434,796 | 3/1969 | Colombo et al. | 134—3 X |
| 3,457,151 | 7/1969 | Kortejarvi | 252—102 X |
| 3,553,140 | 1/1971 | Lindner et al. | 252—94 X |
| 3,660,294 | 5/1972 | Farkas | 134—3 X |
| 3,644,155 | 2/1972 | Hogya et al. | 134—3 X |

FOREIGN PATENTS

| | | | |
|---|---|---|---|
| 206,817 | 2/1957 | Australia | 134—2 |
| 1,068,840 | 11/1959 | Germany | 252—100 |

BARRY S. RICHMAN, Primary Examiner

U.S. Cl. X.R.

134—3, 42; 252—94, 100, 102